United States Patent Office 2,954,359
Patented Sept. 27, 1960

2,954,359
COMPOSITION COMPRISING TRIFLUOROCHLO-ROETHYLENE COPOLYMER AND SILICA AND PROCESS FOR MOLDING SAME

Lester E. Robb, Westfield, and David R. Wolf, Bloomfield, N.J., assignors, by mesne assignments, to Minnesota Mining and Manufacturing Company, St. Paul, Minn., a corporation of Delaware No Drawing. Filed Mar. 14, 1955, Ser. No. 494,249

10 Claims. (Cl. 260—41)

This invention relates to perfluorochloroolefin polymers and in one of its particular aspects to the modification of the physical properties of these polymers by the use of reinforcing fillers.

Because of their unusual chemical and physical characteristics, the fluorine containing thermoplastic polymers are widely used in numerous industrial applications where their properties are best exploited. Among the most outstanding of the properties of the fluorine containing polymers, such as polymers of trifluorochloroethylene, is chemical inertness. Thus, these polymers may be exposed to a wide variety of oxidizing, reducing and solvent-type reagents with little or no apparent effect on the polymer. In addition to their high degree of chemical stability, these polymers possess high thermal stability, excellent electrical properties and are readily molded into various useful end items.

Homopolymers of the perfluorochloroolefins, such as trifluorochloroethylene, have been developed to a high degree of commercial success due to their unique properties as described above. It has been found possible to alter the properties of the homopolymer by copolymerizing the homopolymer with various hydrogen-containing fluorinated olefins. These copolymers of the perfluorochloroolefins have many of the desirable properties of the homopolymer, and additionally, possess characteristics which make them generally useful over and above the homopolymer. In this connection, it has been found that copolymers of the perfluorochloroolefin and a hydrogen-containing fluorinated olefin, for instance trifluorochloroethylene-vinylidene fluoride copolymers which contain above 95 mol percent of the perfluorochloroolefin, are more thermoplastic than the homopolymer. Copolymers containing between above about 69 and below 80 mol percent of the perfluorochloroolefin are soluble in a wide variety of oxygenated organic solvents, such as esters, ketones, and cyclic ethers, and may thus be applied in the form of coatings. Copolymers containing between about 20 and about 69 mol percent of perfluorochloroolefin are elastomeric and therefore can be fabricated into various rubbery end items.

With reference to the above copolymers and with particular reference to the elastomeric copolymers, it is frequently desirable to employ fillers. These fillers dilute the quantity of raw materials which are needed to fabricate end items, and to a limited extent, modify the physical properties of the elastomer. In the case of elastomeric perfluorochloroolefin copolymers, a number of materials are suitable for use as fillers, such as clay, asbestos, etc. These fillers simply dilute the quantity of elastomeric which is needed in a particular end item without modifying, to a significant extent, the physical properties of the elastomer. Fillers of the type usually referred to as "reinforcing" fillers, would greatly extend the range of utility of the perfluorochloroolefin polymers by providing a means for altering the physical characteristics of the polymer involved. Reinforcing fillers not only act as diluents, but additionally, exhibit a pronounced effect on the characteristics of the filled material. High tensile strengths, greater elongation, etc., can be obtained by their use. Precisely how reinforcing fillers alter the characteristics of the material in which they are blended is not known. Many observers believe that the reinforcement is due to a surface absorption phenomena. Whatever the reason for reinforcement, it is interesting to note that there is no basis for predicting or extrapolating observed behavior of a given material in one polymer to another. For example, clays, asbestos, etc., which do not reinforce perfluorochloroolefin polymers are widely used as reinforcing fillers in other elastomer systems. The term polymer includes both homopolymers and copolymers.

It is an object of this invention to provide reinforcing fillers for the perfluorochloroolefin polymers.

It is another object of this invention to provide an elastomeric perfluorochloroolefin polymer composition having improved physical characteristics.

It is another object of this invention to provide a process for modifying the physical properties of the perfluorochloroolefin copolymers.

It is still another object of this invention to provide materials which alter the physical characteristics of elastomeric perfluorochloroolefin polymer systems.

It is one of the more particular objects of this invention to improve the physical properties of elastomeric copolymers of trifluorochloroethylene and vinylidene fluoride.

Various other objects and advantages of the present invention will become apparent to those skilled in the art on reading the accompanying description and disclosure.

In general, each of the above objects is accomplished by employing a silica reinforcing filler in conjunction with the perfluorochloroolefin polymer. Since the copolymers to which this invention is applicable can be cured or cross-linked, it will usually be desirable to incorporate curing agents, accelerators, etc. in addition to the silica reinforcing fillers.

As indicated previously, the copolymers to which this invention is applicable are prepared by copolymerizing a perfluorochloroolefin with a hydrogen-containing fluorinated olefin. Representative of suitable perfluorochloroolefins, are trifluorochloroethylene, symmetrical and unsymmetrical dichlorodifluoroethylene, 2-chloroperfluoropropene, etc.; representative of the hydrogen-containing fluorinated olefins which can be used as comonomers in the copolymerization with the above described perfluorochloroolefins, are vinylidene fluoride, vinyl fluoride, 1,2-difluoroethylene, 1,1,1-trifluoropropene, etc. The preferred copolymer is prepared by copolymerizing trifluorochloroethylene and vinylidene fluoride and where maximum elastomeric properties are desired, by effecting the copolymerization so as to produce a copolymer containing between about 20 and about 69 mol percent of the perfluorochloroolefin, e.g., trifluorochloroethylene.

Since the process of this invention relates to the reinforcement of polymers and not to the preparation of the polymer that is reinforced, unnecessarily detailed description of the method of preparation of the copolymer is not warranted. However, for a fuller understanding of the invention, an example showing the preparation of the elastomeric copolymer is given below in which a water-suspension type recipe was used.

The preferred elastomeric copolymer may be prepared using the following water-suspension type recipe.

| | Parts by weight |
|---|---|
| Water, distilled | 200. |
| $CF_2=CFCl$ | 64.5 ⎫ 50/50 molar |
| $CF_2=CH_2$ | 35.5 ⎭ |
| $K_2S_2O_8$ | 1.0 |
| $Na_2S_2O_5$ | 0.4 |
| $FeSO_4 \cdot 7H_2O$ | 0.1 |

Catalyst and activator solution was prepared by dissolving 1 part of $K_2S_2O_8$ in 20 parts of water. In still another 20 parts of water, 0.1 part of $FeSO_4 \cdot 7H_2O$ was dissolved. 140 parts of water were next charged to a silver-lined steel bomb. The aforementioned $K_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 64.5 parts of $CF_2=CFCl$ and 35.5 parts of $CF_2=CH_2$ were flash-distilled into it. The bomb was then rocked at room temperature (between about 25° C. and about 35° C.) for a period of 24 hours. The residual monomer was then vented from the bomb and a mixture of water and chunks of rubbery polymer were discharged. These chunks were washed with hot water to remove residual salts and were then dried in vacuo at room temperature. The mol percent of $CF_2=CFCl$ combined in the resulting copolymeric product was 49 percent. By varying the monomer feed ratios and the monomers employed, any copolymer system, as described above, can be prepared.

As indicated previously, reinforcement of the perfluorochloroolefin copolymers is achieved by the use of silica. The silica can be naturally occurring or can be prepared by standard precipitation processes or by oxidation of silicon tetrachloride. Anhydrous silica and silica gel can be employed although no advantage results from the use of the more expensive anhydrous silica. The silica can be subjected to various refining processes, e.g. acid extraction, which increase its purity. In this connection, it should be noted that relatively impure grades of silica can be employed provided that the impurities do not exceed about 25 percent by weight based on the silica. Impurities which are normally present in silica, include metal oxides, such as calcium oxide, aluminum oxide, iron oxide and salts, such as sodium sulfate and sodium chloride. However, these impurities, since they exert no reinforcing effect, tend to diminish the reinforcing effect of the silica. Other impurities can also be present provided that they do not cause degradation of the polymer. The free silica, described above, can be combined with a variety of organic materials which enhance the organophilic properties, and in some instances the hydrophobic properties, of the silica. Included among the combined silicas are the silicone coated silicas. These silicone coated silicas are prepared by treating silica gel with a solution of silicone polymer, preferably normally liquid, in a suitable solvent, such as lower alcohols, ketones, etc. When silica is treated in this manner, a physical bond is believed to be developed between the silica and the silicone polymer. The silicone polymers which can be employed, are those homopolymers in which the siloxane units are $(CH_3)_2SiO$ or $(CH_3)C_6H_5SiO$. The copolymer siloxanes may contain any combination of the above units and in addition may contain small amounts of $(C_6H_5)_2SiO$, etc. Other silicone polymers can be employed although the above enumerated are preferred. In addition to coating the silica fillers as described above, the silica can be chemically bonded to organophilic materials. To provide a chemical bonded silicone coated silica surface, a halo silane or an amino silane is polymerized in the presence of the finely divided silica gel. The silicone polymers described above are again preferred. In addition to the silicone coated silicas, a class of compounds known as the Estersils can be employed. The Estersils are prepared by reacting an alcohol with silica. The precise mechanism is not known but it is believed that the alcohol reacts with siliceous acid ($H_2SiO_3$) so as to form the corresponding esterified silica. The alcohols with which the silica is esterified, are the aliphatic alcohols having from 2:18 carbon atoms and preferably from 3:12 carbon atoms. While polyhydric alcohols can be employed, the primary and secondary monohydric alcohols are preferred. Typical of the alcohols which can be employed are primary and secondary monohydric alcohols, such as ethyl, n-propyl, n-butyl, n-amyl, n-hexyl, n-heptyl, n-octyl, n-nonyl, n-decyl, n-undecyl, n-dodecyl, etc., alcohols; branched chain primary alcohols, such as isobutyl and isoamyl alcohols; secondary alcohols such as isopropyl, sec butyl alcohols and the alicyclic alcohols such as cyclopentanol and cyclohexanol. The quantity of the organophilic compound employed should be sufficient to provide a layer, usually monomolecular, on at least 25% of the surface of the silica and preferably on at least 50% of the surface. From the foregoing, it will be apparent that silica in a variety of forms can be employed as reinforcing fillers for the polymers herein described. Detailed description of the methods of preparing the reinforcing silicas can be found in the literature. Irrespective of the type of silica employed, the silica should be in finely divided form. The particle size of the silica should not exceed 20 microns and should preferably be below about 10 microns in order to secure maximum reinforcement. For a given type of silica, maximum reinforcement is attained with the finest particle size used.

In blending the silica reinforcing fillers of this invention with the perfluorochloroolefin polymers, between about 1 and about 50 parts by weight of silica per 100 parts of polymer, preferably between about 10 and 30 parts of silica is admixed with the polymer and thoroughly dispersed therein. For example, 100 grams of a copolymer of trifluorochloroethylene and vinylidene fluoride (50/50 mol ratio) are banded on a rubber mill. 20 grams of refined silica in finely divided form is then added to the rolling bank of elastomer in the nip of the rolls. After blending, the filled elastomer is then pressed into a sheet at a temperature of about 230° F. and a pressure of about 1000 p.s.i. The sheet has the characteristics of a reinforced gum rubber with the added advantage of high chemical resistance. As indicated previously, copolymers of the perfluorochloroolefins and particularly the elastomeric copolymers that is, those having a mol concentration of perfluorochloroolefin between about 20 and about 69 mol percent, are susceptible to cross-linking or vulcanization. While the use of the silica reinforcing fillers is advantageous in those instances where uncured or gum rubber is required, in most instances it will be found preferable to incorporate curing or cross-linking agents and accelerators into the polymer.

Curing or cross-linking of the copolymer is effected by incorporating within the copolymer a cross-linking agent which can be a peroxy type compound, a polyfunctional amino compound or a precursor of a polyfunctional amino compound. The peroxy type compounds include both organic and inorganic compounds which contain oxygen atoms directly linked to oxygen atoms and should be stable below about 50° C. in order to avoid cross-linking during the blending operation. Among the organic peroxy compounds, are the acyl and acoyl peroxides, and hydroperoxides, such as ditertiary butyl peroxide, dilauryl peroxide, dibenzoyl peroxide and ditertiary butyl hydroperoxide. The organic peroxy type compounds also include peresters having either organic or inorganic peroxy oxygen. The former would include such compounds as alkyl and aryl perbenzoates, while the latter would include alkyl and aryl persulfates. Among the inorganic peroxy compounds, are hydrogen and metal peroxides, such as lead, barium and zinc peroxide. Among the polyfunctional amine compounds which may be used as cross-linking agents, are ethylene diamine, diethylene triamine, triethylene tetramine, tetraethylene pentamine, hexamethylene diamine, piperazine, 1,5-naphthalene diamine, diaminoanisole, diaminobenzoic acid (all isomers), diamino stilbene (all isomers), diaminotriphenylmethane, triaminotriphenylmethane, diaminophenol (all isomers), tetramino 3,3-dimethyl-diphenylmethane, diaminobenzene (all isomers), triaminobenzene (all isomers), triaminobenzoic acid (all isomers), triaminophenol, 1,2-propylenediamine, 1,2,3-triaminopropane, etc. Among the precursors of amines, are the polyisocyanates, polyisothioamine, polyamine salts, polyureas, polycarbamyl halides and polyurethanes. Precursors of amines are compounds which by their own decomposition or by reaction with other materials under curing conditions, produce polyamines. Preferred amines are the primary aliphatic diamines. The curing or cross-linking agent is used in a concentration between about 0.5 and about 20 parts by weight preferably between about 3 and about 15 parts by weight based on 100 parts by weight of polymer.

In cross-linking the perfluorochloroolefin polymers, it is preferred to incorporate in addition to the above described cross-linking agents basic metal compounds which react as accelerators. Among the basic metal compounds which can be employed as accelerators, are the basic metal oxides, such as magnesium oxide, zinc oxide and lead oxide and additionally, in the case of peroxide cured recipes, the basic lead salts, such as dibasic lead phosphite, tribasic lead sulfate and tribasic lead maleate. Where basic lead salts are used they are preferably used in combination with basic metal oxides since a synergistic effect appears to result from the combination. The precise mechanism of the acceleration is not known. The concentration of the basic metal compound will vary from about 0.5 to about 30 parts by weight and preferably from about 1 to about 20 parts by weight for each 100 parts of polymer.

In compounding the perfluorochloroolefin copolymer so as to effect cross-linking, the copolymer is mixed with suitable accelerators and curing agents. To provide reinforcement, silica fillers as described above, are added to the polymer. Blending of the components is carried out in suitable mechanical mixing equipment, such as two roll mills, Banbury mills and screw type plasticators. Since the mechanical blending involves shearing forces which necessarily generate heat, the cross-linking or curing agent is usually added last. In a preferred method of operation, the copolymer is introduced into the mixing equipment after which the accelerator and the silica reinforcing filler are added. When these have been thoroughly dispersed in the copolymer, the curing agent is added. Curing of the polymer is effected using an initial (e.g., press) cure between about 150° F. and about 350° F. for a period of time between about 10 minutes and about 3 hours at a pressure between about 500 and about 1500 p.s.i. followed by an after cure (e.g., oven cure) at between about 250° F.–350° F. for between about 1 and about 72 hours at atmospheric pressure. In the case of peroxide cured recipes lower initial cures are preferred, e.g., between about 190° F. and about 250° F. while in the case of amine cured stock, higher cures are preferred, i.e., between about 250° F. and about 300° F. Molding can be accomplished using compression, extrusion and injection techniques.

In order to illustrate the process of this invention, the following tables of data are presented. The data in the tables illustrates the reinforcing effect of different types of silica. The precipitated silica referred to in the tables is commercially available as Hi-Sil 202. This silica is prepared by a wet precipitation process and shows the following composition on analysis; $SiO_2$ 84 percent, $Al_2O_3$ 4 percent, $CaO$ 1 percent, $NaCl$ 1 percent, $Fe_2O_3$ .3 percent and the balance of water. The refined silica is commercially available as Hi-Sil 303 and has the following composition, $SiO_2$ 88 percent, $Na_2SO_4$ 0.1 percent, $CaO$ 0.04 percent. The silicone coated silica is available as LM-3 and is prepared by coating silica with a linear dimethyl siloxane polymer. The esterified silica is commercially available as Valron Estersil. This particular esterified silica has a completely hydrophobic surface of 3 butoxy groups per square millimicron on a particle of mean ultimate diameter of 8–10 millimicrons. In preparing the recipes given in the tables below, the following procedure was employed. 100 grams of elastomer was placed on a two roll mill and worked until a continuous band was formed. The rolls were heated to a temperature of about 60° C. to hasten the formation of the band. After the copolymer was banded, the accelerator, silica and curing agents were slowly added, in the order given, to the rolling bank of copolymer in the nip of the rolls, with cutting and turning of the copolymer as it banded on the rolls. During the blending operation, the temperature was maintained at about 100–150° F. After the addition of all the ingredients, the batch was thoroughly mixed on the rolls and then sheeted out for the molding operation which in this case involved the preparation of standard A.S.T.M. test sheets. These test sheets were prepared by taking a sheet of stock approximately 10 percent thicker than that desired, and placing

*Table I*

| Filler Type | Control | Silica | Silicone Coated Silica | Refined Silica | Esterified Silica |
|---|---|---|---|---|---|
| Stock Number | 89 | 119 | 122 | 183 | 195 |
| Compound: | | | | | |
| Trifluorochloroethylene-Vinylidene Fluoride Copolymer (50/50 mol ratio) | 100 | 100 | 100 | 100 | 100 |
| Zinc Oxide | 10 | 10 | 10 | 10 | 10 |
| Dibasic Lead Phosphite | 10 | 10 | 10 | 10 | 10 |
| Benzoyl Peroxide | 3 | 3 | 3 | 3 | 3 |
| Hi-Sil-202 | | 20 | | | |
| LM-3 | | | 20 | | |
| Hi-Sil-303 | | | | 20 | |
| Valron Estersil | | | | | 20 |
| Press Cure: | | | | | |
| Temperature, °F | 230 | 230 | 230 | 230 | 230 |
| Time, hrs | ½ | ½ | ½ | ½ | ½ |
| Pressure, p.s.i. | 1,000 | 1,000 | 1,000 | 1,000 | 1,000 |
| Oven Cure: | | | | | |
| Temperature, °F | 300 | 300 | 300 | 300 | 300 |
| Time, hrs | 16 | 16 | 16 | 16 | 16 |
| Physical Properties: | | | | | |
| After Cure— | | | | | |
| Tear Strength, p.p.i. | 104 | 370 | 254 | 402 | 426 |
| Tensile Strength, p.s.i. | 2,170 | 1,410 | 2,790 | 2,250 | 1,600 |
| Stress at 300% E, p.s.i. | 820 | 1,215 | 1,670 | 1,630 | 1,280 |
| Percent Elongation | 450 | 600 | 450 | 520 | 550 |
| Hardness, Shore A | 58 | 76 | 71 | 81 | 89 |
| Aged Three Days at 400° F.— | | | | | |
| Tensile Strength, p.s.i. | 1,235 | 725 | 1,295 | 1,610 | 1,440 |
| Stress at 300% E, p.s.i. | 371 | 930 | 906 | 1,130 | |
| Percent Elongation | 800 | 600 | 675 | 625 | 225 |
| Hardness, Shore A | 60 | 78 | 75 | 84 | 93 |
| Aged Nine Days at 400° F.— | | | | | |
| Tensile Strength, p.s.i. | 1,315 | [1]1,080 | 1,185 | 1,625 | 1,585 |
| Stress at 300% E, p.s.i. | 435 | 870 | 1,130 | 1,440 | |
| Percent Elongation | 825 | 325 | 600 | 550 | 200 |
| Hardness, Shore A | 59 | 79 | 74 | 83 | 93 |

[1] Maximum tensile at 150% yield point, tensile at break=755.

it in a mold. The mold was placed in a suitable press having platens heated to 230–260° F. The mold was then closed and the sheet formed, partially cured in the press collecting the data of Table I. In each case 100 grams of copolymer was used. The weight of the additives is given in grams.

Table II

| Type Cure—<br>Filler Type | Isocyanate | | Isocyanate Amine | | Amine | |
|---|---|---|---|---|---|---|
| | Control | With Silica | Control | With Silica | Control | With Silica |
| Stock Number | 1 | 218 | 98 | 219 | 37 | 221 |
| Compound: | | | | | | |
| Trifluorochloroethylene-Vinylidene Fluoride Copolymer (50/50 mol ratio) | 100 | 100 | 100 | 100 | 100 | 100 |
| Zinc Oxide | 5 | 5 | 5 | 5 | 5 | 5 |
| Hi-Sil-303 | | 20 | | 20 | | 20 |
| Methylene bis-(4-phenyl isocyanate) | 5 | 5 | 5 | 5 | | |
| Tetraethylene pentamine | | | 1 | 1 | 6 | 6 |
| Press Cure: | | | | | | |
| Temp., °F | 260 | 260 | 260 | 260 | 260 | 260 |
| Time, hrs | 1 | 1 | 1 | 1 | 1 | 1 |
| Pressure, p.s.i | 1,000 | 1,000 | 1,000 | 1,000 | 1,000 | 1,000 |
| Oven Cure: | | | | | | |
| Temp., °F | 212 | 250 | 212 | 250 | 300 | 250 |
| Time, hrs | 72 | 24 | 16 | 16 | 1 | 16 |
| Physical Properties: | | | | | | |
| After Cure— | | | | | | |
| Tensile Strength, p.s.i | 800 | 1,930 | 1,250 | 1,850 | 1,620 | 2,150 |
| Stress at 300% E, p.s.i | 590 | 1,670 | 630 | 1,830 | 1,020 | 2,150 |
| Percent Elongation | 320 | 400 | 580 | 300 | 450 | 300 |
| Hardness, Shore A | 61 | 79 | 60 | 82 | 55 | 80 | followed by heating in an air-oven. The actual temperatures, pressures and curing times are specified in the tables.

In Table I are presented data illustrating the use of the sicila reinforcing fillers of this invention in a peroxide cured stock.

In order to illustrate the use of the silica reinforcing fillers of this invention in an amine, isocyanate and amine-isocyanate vulcanized stock, the data of Table II is presented below. In this table refined silica (Hi-Sil-303) was used in each instance. The copolymers and the compounding techniques employed were the same as used in collecting the data of Table I. In each case 100 grams of copolymer was used. The weight of the additives is given in grams.

As indicated previously, reinforcement of the elastomeric perfluorochloroolefin polymers is achieved only by the use of silica fillers. Thus, asbestos, clay, barytes, and alumina when compounded into the elastomer do not exhibit any reinforcing properties. In order to illustrate this phenomenon the following table is presented. Here again, the compounding technique was the same as described with reference to Table I. 100 grams of copolymer was employed. The weight of the additives is given in grams.

Table III

| Filler Type | Asbestos | Clay | Barytes | Alumina | Refined Clay |
|---|---|---|---|---|---|
| Stock Number | 190 | 191 | 192 | 193 | 201 |
| Trifluorochloroethylene-Vinylidene Fluoride Copolymer (50-50 mol ratio) | 100 | 100 | 100 | 100 | 100 |
| Zinc Oxide | 10 | 10 | 10 | 10 | 10 |
| Dibasic Lead Phosphite | 10 | 10 | 10 | 10 | 10 |
| Benzoyl Peroxide | 3 | 3 | 3 | 3 | 3 |
| Asbestine-3X | 20 | | | | |
| Iceberg Pigment | | 20 | | | |
| Barium Sulfate | | | 20 | | |
| Hydrous Alumina | | | | 20 | |
| ASP 600 | | | | | 20 |
| Press Cure: | | | | | |
| Temp., °F | 230 | 230 | 230 | 230 | 230 |
| Time, hrs | ½ | ½ | ½ | ½ | ½ |
| Pressure p.s.i | 1,000 | 1,000 | 1,000 | 1,000 | 1,000 |
| Oven Cure: | | | | | |
| Temp., °F | 300 | 300 | 300 | 300 | 300 |
| Time, hrs | 16 | 16 | 16 | 16 | 16 |
| Physical Properties: | | | | | |
| After Cure— | | | | | |
| Tear Strength, p.p.i | 157 | 161 | 151 | 197 | 223 |
| Tensile Strength, p.s.i | 1,920 | 1,670 | 1,580 | 2,010 | 2,060 |
| Stress at 300% E, p.s.i | 1,270 | 1,360 | 905 | 1,210 | 1,560 |
| Percent Elongation | 500 | 400 | 425 | 460 | 620 |
| Hardness, Shore A | 67 | 67 | 62 | 66 | 66 |
| Aged Three Days at 400° F.— | | | | | |
| Tensile Strength, p.s.i | 720 | 740 | 930 | 727 | 810 |
| Stress at 300% E, p.s.i | 740 | 716 | 470 | 590 | 871 |
| Percent Elongation | 870 | 800 | 800 | 780 | 650 |
| Hardness, Shore A | 67 | 67 | 65 | 68 | 69 |
| Aged Nine Days at 400° F.— | | | | | |
| Tensile Strength, p.s.i | 660 | 710 | 1,000 | 940 | [1] 938 |
| Stress at 300% E, p.s.i | 765 | 855 | 570 | 850 | 870 |
| Percent Elongation | 750 | 775 | 775 | 800 | 600 |
| Hardness, Shore A | 69 | 68 | 64 | 67 | 68 |

[1] Maximum tensile at 200% yield point, tensile at break=633.

In addition to the above described additives, various other additives can be incorporated within the normally solid copolymer described herein. Thus, plasticizers, softeners, etc. can be added to further modify physical properties, while colored organic and inorganic pigments can be added to modify esthetic properties.

Various alterations and modifications of the invention and its aspects may become apparent to those skilled in the art without departing from the scope of this invention.

Having thus described our invention, we claim:

1. A novel composition comprising an elastomeric copolymer containing between about 20 and about 69 mol percent of trifluorochloroethylene copolymerized with vinylidene fluoride admixed with a cross-linking agent selected from the group consisting of a peroxy compound and a polyfunctional amino compound and from 1 to 50 parts by weight of silica per 100 parts by weight of copolymer, as a reinforcing filler.

2. The composition of claim 1 in which the cross-linking agent is a polyfunctional amine.

3. The composition of claim 2 in which the polyfunctional amine is tetraethylene pentamine.

4. The composition of claim 1 in which the cross-linking agent is a polyisocyanate.

5. The composition of claim 4 in which the polyisocyanate is methylene bis-(4-phenyl isocyanate).

6. The composition of claim 1 in which the cross-linking agent is an organic peroxide.

7. The composition of claim 6 in which the organic peroxide is benzoyl peroxide.

8. A novel composition comprising a copolymer containing between about 20 and about 69 mol percent of trifluorochloroethylene copolymerized with vinylidene fluoride admixed with a cross-linking agent selected from the group consisting of a peroxy compound and a polyfunctional amino compound in an amount between about 1 and about 20 parts by weight per 100 parts by weight of said copolymer and a reinforcing filler comprising silica in an amount between about 10 and about 30 parts by weight per 100 parts of said copolymer.

9. A novel composition comprising a crosslinked copolymer containing between about 20 and about 69 mol percent of trifluorochloroethylene copolymerized with vinylidene fluoride, said copolymer crosslinked with a crosslinking agent selected from the group consisting of a peroxy compound and a polyfunctional amino compound and from 1 to 50 parts by weight of silica per 100 parts by weight of copolymer, as a reinforcing filler.

10. A process for reinforcing copolymers containing between about 20 and about 69 mol percent of trifluorochloroethylene copolymerized with vinylidene fluroide which comprises admixing from 1 to 50 parts by weight of silica per 100 parts by weight of copolymer and a crosslinking agent selected from the group consisting of a peroxy compound and a polyfunctional amino compound and molding under pressure the reacting mixture at a temperature between about 150 and about 350° F. and at a pressure between 500 and 1500 p.s.i.

References Cited in the file of this patent

UNITED STATES PATENTS

| 2,367,880 | Lindh | Jan 23, 1945 |
| 2,456,621 | Cheney | Dec. 21, 1948 |
| 2,468,054 | Ford | Apr. 26, 1949 |
| 2,631,998 | Pearson | Mar. 17, 1953 |
| 2,732,357 | Sprung | Jan. 24, 1956 |

OTHER REFERENCES

Rubber Age, September 1954, page 884.
India Rubber World, August 1949, pages 577–581 and 586.